(12) United States Patent
Kano

(10) Patent No.: US 8,243,303 B2
(45) Date of Patent: Aug. 14, 2012

(54) IMAGE FORMING SYSTEM, IMAGE FORMING APPARATUS, AND IMAGE FORMING PROCESSING METHOD

(75) Inventor: Takahiro Kano, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1171 days.

(21) Appl. No.: 11/419,002

(22) Filed: May 18, 2006

(65) Prior Publication Data

US 2007/0019232 A1    Jan. 25, 2007

(30) Foreign Application Priority Data

Jul. 22, 2005  (JP) ................. 2005-213535

(51) Int. Cl.
  *G06K 15/00*  (2006.01)
  *G06F 3/12*   (2006.01)
  *H04N 1/40*   (2006.01)
(52) U.S. Cl. ............. 358/1.15; 358/1.14; 358/1.16; 358/3.28
(58) Field of Classification Search .......... 358/1.14, 358/1.15, 470, 473, 1.9, 3.28, 443, 445
See application file for complete search history.

(56) References Cited

U.S. PATENT DOCUMENTS

| | | | |
|---|---|---|---|
| 6,201,903 B1* | 3/2001 | Wolff et al. | 382/317 |
| 2004/0051885 A1* | 3/2004 | Matsunoshita | 358/1.9 |
| 2004/0150855 A1 | 8/2004 | Tonegawa | |
| 2005/0038872 A1* | 2/2005 | Ono et al. | 709/218 |
| 2005/0052695 A1* | 3/2005 | Fukunaga et al. | 358/1.15 |

FOREIGN PATENT DOCUMENTS

| | | |
|---|---|---|
| JP | 10-207658 | 8/1998 |
| JP | 2001-318886 | 11/2001 |
| JP | 2002-369110 | 12/2002 |
| JP | 2003-067275 | 3/2003 |
| JP | 2003-169187 | 6/2003 |
| JP | 2004-140502 | 5/2004 |
| JP | 2004-227247 | 8/2004 |
| JP | 2005-146755 | 6/2005 |

OTHER PUBLICATIONS

Notification of Reasons for Refusal; issued Jan. 22, 2008 in JP 2005-213535, and translation thereof.

* cited by examiner

*Primary Examiner* — James A Thompson
(74) *Attorney, Agent, or Firm* — Buchanan Ingersoll & Rooney PC

(57) ABSTRACT

An image forming system includes an image forming apparatus and a mobile terminal. The image forming apparatus includes: a two-dimensional code output unit for outputting a two-dimensional code into which address information of the image forming apparatus is converted; and a job execution unit for executing a job transmitted from the mobile terminal that has accessed the image forming apparatus based on address information into which the two-dimensional code obtained by photographing an image of the two-dimensional code outputted from the image forming apparatus by the mobile terminal is inversely converted. The mobile terminal includes: a photographing unit for photographing an image of the two-dimensional code; an inverse converter for inversely converting the photographed two-dimensional code into address information; and a communication unit for accessing an address of the image forming apparatus, which address is obtained through the inverse conversion, to transmit a job.

13 Claims, 4 Drawing Sheets

IMAGE FORMING SYSTEM, IMAGE FORMING APPARATUS, AND IMAGE FORMING PROCESSING METHOD

This application claims priority under 35 U.S.C. §119 to Japanese Patent Application No. 2005-213535 filed on Jul. 22, 2005, the entire disclosure of which is incorporated herein by reference in its entirety.

BACKGROUND OF THE INVENTION

1. Field of the Invention

The present invention relates to an image forming system for causing an image forming apparatus to execute a job transmitted from a mobile terminal, such as a mobile phone, to an image forming apparatus for use in such a system, and to an image forming processing method.

2. Description of the Related Art

The printer, one type of image forming apparatuses, recently has been increasingly used in such a manner as to be shared by a plurality of users through a network.

Due to widespread use of mobile terminals such as mobile phones, there has been a growing demand for transmitting print data from a mobile phone to a printer through a network so as to perform printing.

However, to give instructions from the mobile terminal to the printer through the network, the network address of the printer needs to be inputted into the mobile terminal. Manually inputting such a network address is a bothersome operation.

Japanese Unexamined Patent Publication No. H10-207658 discloses a print system such that, a URL (Uniform Resource Locator) including information to be printed is specified for a printer so that the printer accesses the specified URL to obtain and print the information to be printed.

Japanese Unexamined Patent Publication No. 2001-318886 discloses a system such that a content server, which has received from an information providing server an assigned QR code corresponding to detailed information, prints this QR code onto a magazine or the like, and a user who has purchased this magazine transmits the QR code read by a QR code reader to the information providing server through the printer, whereby information corresponding to the QR code is transmitted from the information providing server to the printer and then is printed by the printer.

Japanese Unexamined Patent Publication No. 2004-227247 discloses a printing apparatus that scans a handout provided with a QR code to download an image, extracts index data by seeking the QR code from the downloaded image and analyzing this QR code, and searches a database based on this index data so as to acquire and print image data corresponding to the handout.

The technologies disclosed in the documents described above do not achieve printing by transmitting print data from a mobile terminal to a printer; therefore, they have failed to provide a solution to meet a demand for achieving a system capable of eliminating burden of inputting the address of the printer and also capable of, through simple operation, providing instructions from the mobile terminal to an image forming apparatus for performing printing and the like.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an image forming system capable of eliminating burden of inputting the address of an image forming apparatus, such as a printer, and also capable of, through simple operation, providing instructions from a mobile terminal to the image forming apparatus for job execution, such as printing or the like.

Among other potential advantages, some embodiments can provide an image forming apparatus preferably used in the system described above.

Among other potential advantages, some embodiments can provide an image forming processing method capable of eliminating burden of inputting the address of an image forming apparatus such as a printer or the like and also capable of, through simple operation, providing instructions from the mobile terminal to the image forming apparatus for job execution.

According to a first aspect of the preferred embodiment of the present invention, an image forming system comprising an image forming apparatus and a mobile terminal, wherein the image forming apparatus comprises: a two-dimensional code output unit for outputting a two-dimensional code into which address information of the image forming apparatus is converted; and a job execution unit for executing a job transmitted from the mobile terminal that has accessed the image forming apparatus based on address information into which the two-dimensional code obtained by photographing an image of the two-dimensional code outputted from the image forming apparatus by the mobile terminal is inversely converted, wherein the mobile terminal comprises: a photographing unit for photographing an image of the two-dimensional code; an inverse converter for inversely converting the photographed two-dimensional code into address information; and a communication unit for accessing an address of the image forming apparatus, which address is obtained through the inverse conversion, to transmit a job.

According to a second aspect of the preferred embodiment of the present invention, an image forming apparatus comprising:

a two-dimensional code output unit for outputting a two-dimensional code into which address information of the image forming apparatus is converted; and a job execution unit for executing a job transmitted from the mobile terminal that has accessed the image forming apparatus based on address information into which the two-dimensional code of which the image outputted from the image forming apparatus is photographed by the mobile terminal is inversely converted.

According to a third aspect of the preferred embodiment of the present invention, an image forming processing method including the steps of:

outputting a two-dimensional code into which address information is converted from an image forming apparatus;

photographing an image of the two-dimensional code outputted from the image forming apparatus by a mobile terminal;

inversely converting the photographed two-dimensional code into the address information by the mobile terminal;

accessing an address of an image forming apparatus, which address is obtained through inverse conversion, to transmit a job from the mobile terminal; and executing the job transmitted from the mobile terminal by the image forming apparatus.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
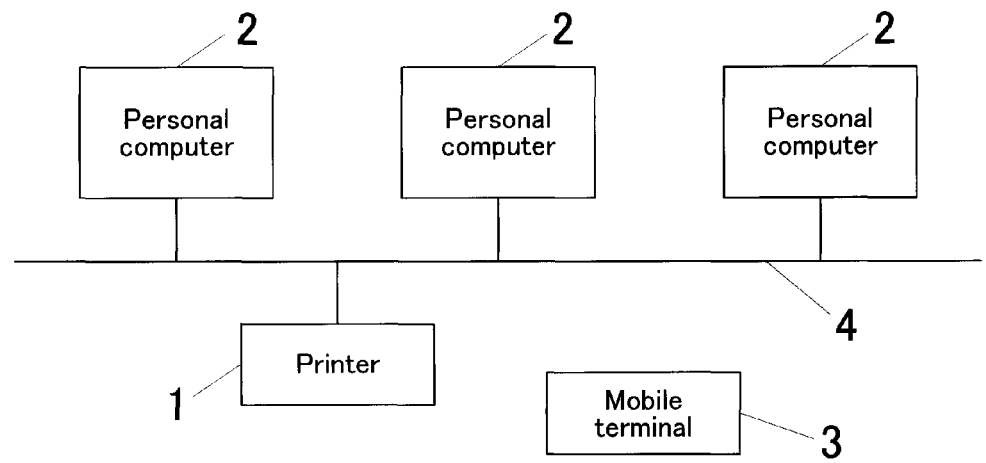
FIG. 1 is a schematic diagram of an image forming system according to one embodiment of the present invention.

FIG. 1 is a schematic diagram of an image forming system according to one embodiment of the present invention.

The image forming apparatus is composed of an image forming apparatus 1 and a mobile terminal 3. The image forming apparatus 1 is connected to a network 4 and is capable of transmitting and receiving data through the network 4 to and from a personal computer 2 serving as a terminal apparatus.

A printer is used as the image forming apparatus 1 in this embodiment. The printer may be provided as a stand-alone function or as a composite machine, i.e., MFP (Multi Function Peripherals), that has, in addition to a printer function, other functions such as a copy function, a facsimile function, a scanner function, and the like.

Figure 2:
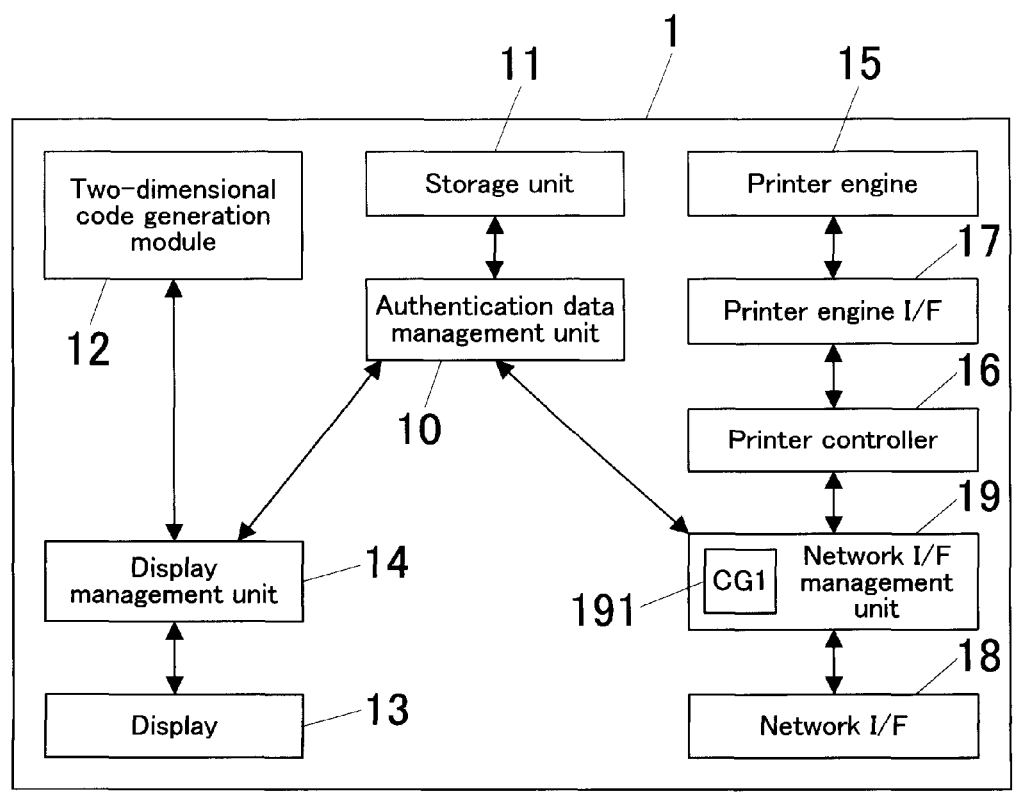
FIG. 2 is a functional schematic diagram showing main units of an image forming apparatus used in the system shown in FIG. 1.

FIG. 2 shows the functional structure of main units of the image forming apparatus 1. This image forming apparatus 1 includes: an authentication data management unit 10, a storage unit 11, a two-dimensional code generation module 12, a display 13, a display management unit 14, a printer engine 15, a printer controller 16, a printer engine interface (indicated as I/F in the figure) 17, a network interface 18, a network interface management unit 19, and the like.

The authentication data management unit 10 manages authentication data through checking, adding, and deleting user authentication data.

The storage unit 11 includes a hard disc and a RAM, and stores, as a table, user authentication data and log in information of a user logging in, and also stores a QR code, i.e., a two dimensional code generated by the two-dimensional code generation module 12, and other data.

The two-dimensional code generation module 12 generates a URI (Uniform Resource Identifier) as address information concerning a printer on which user authentication data is reflected, or a URL, and converts the generated address information into a two-dimensional code, i.e., a QR code. The QR code obtained through the conversion is treated as bit map data. In this embodiment, the two-dimensional code generation module 12 generates a plurality of address information on a purpose-by-purpose basis, and converts into a QR code the address information selected by the user from among the aforementioned plurality of address information. The address information is treated as internally virtual directory information.

The display 13 displays an input screen for inputting user authentication data, address information generated by the two-dimensional code generation module 12, and a QR code obtained through conversion, as well as the mode and state of the printer 1.

The display management unit 14 manages the display 13. The printer engine 15 prints onto paper data of a print job transmitted from a personal computer 2 or a mobile terminal 3, thus functioning as a job executing means.

The printer controller 16 controls the printer engine 15 through the printer engine interface 17.

The network interface 18 communicates with the personal computer 2 and the mobile terminal 3 for data transmission and data reception. In this embodiment, data can be received by a general HTTP (HyperText Transfer Protocol). For example, the printer controller 16 is adapted to be capable of recognizing a PDF (Portable Document Format) file, and thus is capable of directly receiving the PDF file. The printer controller 16 is also capable of receiving print data by using an IPP (Internet Printing Protocol) that is a protocol higher than the HTTP.

The network interface management unit 19 controls the network interface 18. The network interface management unit 18 includes a CGI (Common Gateway Interface), which, upon receiving a network port by an HTTP protocol, analyzes address information and dynamically determines which processing to perform. Typically, using a no. 80 port, a default for the HTTP protocol, the network interface management unit 19, which manages the no. 80 port, can change processing in accordance with address information The mobile terminal 3 is composed of, for example, a mobile phone. The mobile terminal may be composed of, instead of a mobile phone, a PDA (Personal Digital Assistance), a laptop computer, or the like.

Figure 3:
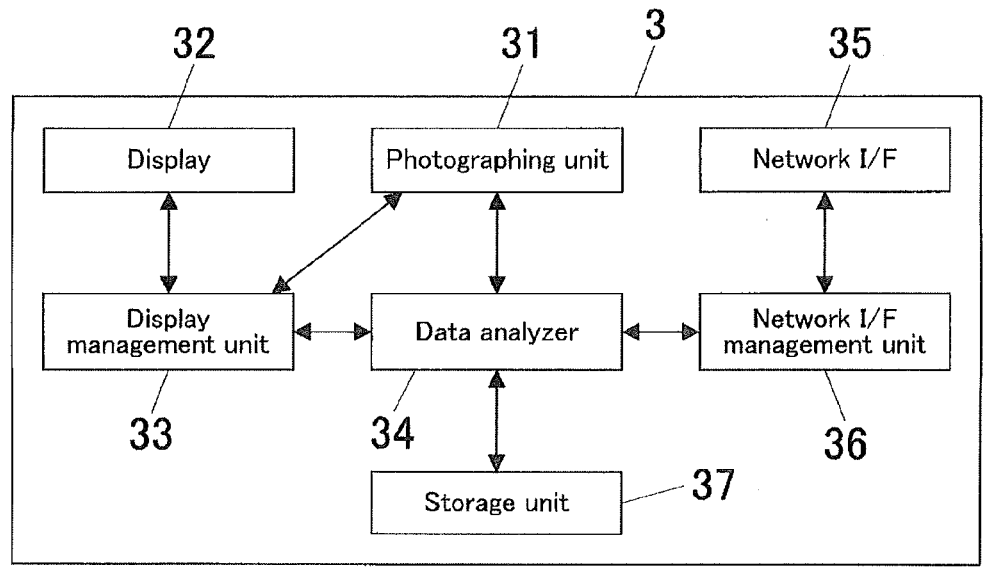
FIG. 3 is a functional schematic diagram showing main units of a mobile terminal used in the system shown in FIG. 1.

FIG. 3 is a block diagram showing the functional structure of the main units of the mobile terminal 3.

The mobile terminal 3 includes: a photographing unit 31, a display 32, a display management unit 33, a data analyzer 34, a network interface 35, a network interface management unit 36, a storage unit 37, and the like.

The photographing unit 31 includes a photographing camera and can photograph a QR code displayed on the display 13 of the printer 1.

The display 32 displays image data photographed by the photographing unit 31, and other data. The display management unit 33 manages and controls the display 32.

The data analyzer 34 inversely converts a QR code photographed by the photographing unit 31 into the original address information. Software used for the inverse conversion may be previously incorporated in the mobile terminal 3, or may be downloaded through an Internet or the like.

The network interface 35 communicates with the printer 1 and the personal computer 2 through the network 4 for data transmission and reception. The network interface management unit 36 manages the network interface 35.

The storage unit 37 stores address information into which a QR code is inversely converted by the data analyzer 34, as well as other data.

Next, the overall operation of the image forming system shown in FIG. 1 will be described, referring to FIG. 4.

Figure 5A:
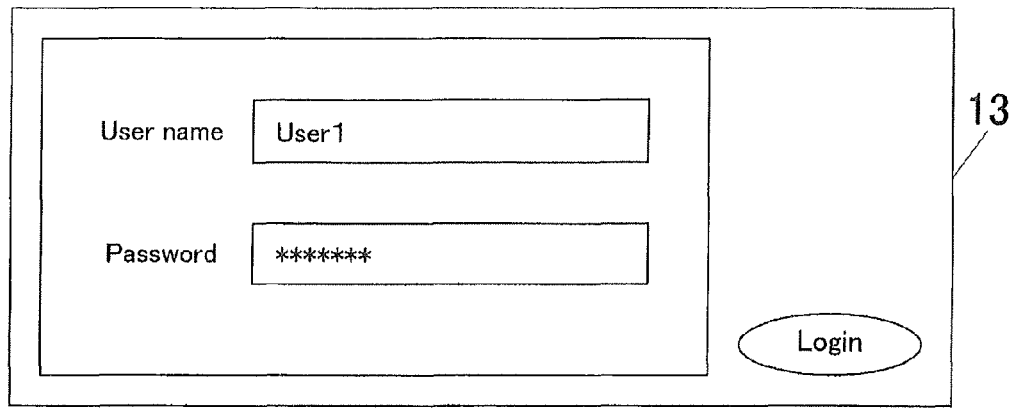
FIG. 5 is a diagram showing a display screen of a display in the image forming apparatus.

First, the user inputs authentication data into the image forming apparatus 1 (indicated by an arrow a). The inputting of the authentication data is achieved in a manner such that the user inputs a user name and a password on the authentication data input screen displayed on the display 13 of the image forming apparatus 1, as shown in FIG. 5A.

The authentication data management unit 10 checks and compares the inputted authentication data with a table previously stored in the storage unit 11.

Figure 4:
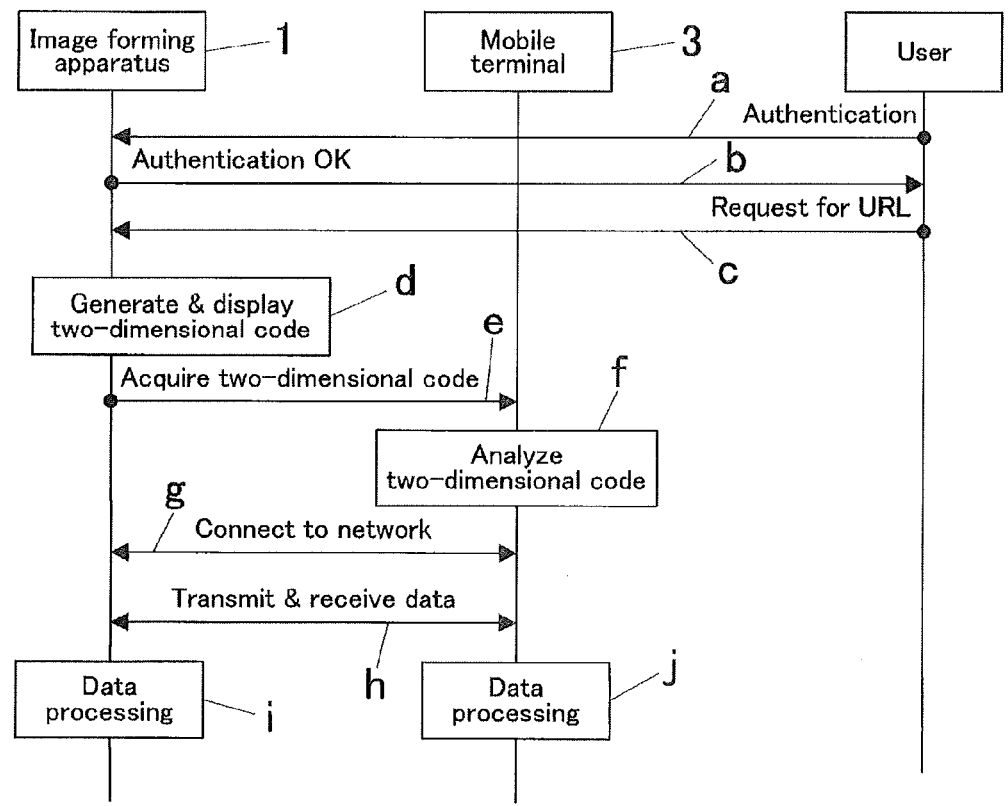
FIG. 4 is a descriptive diagram describing the flow of entire processing performed by the system of FIG. 1.

If the authentication succeeds, the display 13 displays keys for selecting whether or not to require address information for giving instructions for job execution from the mobile terminal 3 (as indicated by an arrow b in FIG. 4).

If the user requires the address information (as indicated by an arrow c in FIG. 4), the two-dimensional code generation module 12 generates virtual address information on which the authentication information is reflected. This address information can be changed in various forms in combination with authentication information. For example, if a base address is: http//(printer address)/(Print_URL,
a virtual directory, http//(printer address)/(Print_URL/(user name)/(user password), is prepared. A manner in which the address is changed is not limited to this manner. That is, a base address may be changed, or a CGI parameter may be added.

Figure 5B:
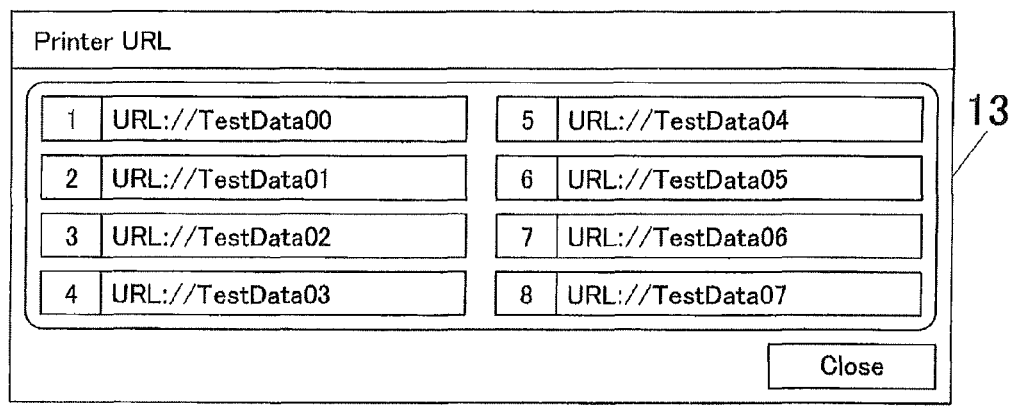

In this embodiment, not only an address for printing, but also a plurality of addresses in accordance with respective purposes, such as abbreviated phone number registration of the mobile terminal, file uploading, and the like, are generated. Then the display 13 displays the generated addresses as shown in FIG. 5B for the user to make selection from among the displayed addresses. Obviously, only an address for print job execution may be generated.

Figure 5C:
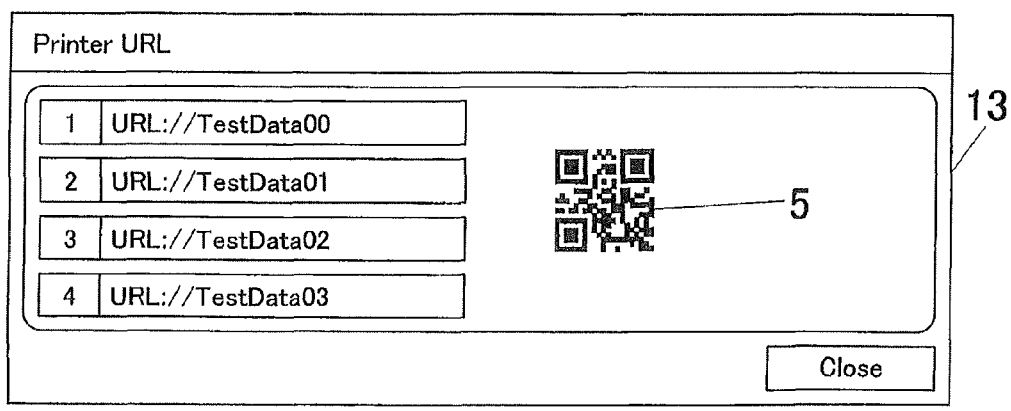

If the user selects the address information for, for example, print job execution, the two-dimensional generation module 12 converts this address information into a QR code, and the display 13 displays the QR code 5 obtained through the conversion as shown in FIG. 5C (d in FIG. 4).

The user photographs the displayed QR code 5 through the photographing unit 31 of the mobile terminal 3 (indicated by an arrow e in FIG. 4). The photographed QR code is analyzed by the data analyzer 34 of the mobile terminal 3 and inversely converted into the address information.

Upon access from the mobile terminal 3 to an address indicated by this address information obtained by the inverse conversion (indicated by an arrow g in FIG. 4), in the image forming apparatus 1, the CGI 191 analyses the received address information to recognize the processing details thereof, and the authentication data management unit 10 checks authentication information included in the address information, whereby authentication is performed.

If the authentication succeeds, data transmission and reception are performed between the mobile terminal 3 and the image forming apparatus 1 (indicated by the arrow g in FIG. 4), and the image forming apparatus 1 and the mobile terminal 3 perform respective processing (indicated by arrows i and j in FIG. 4), whereby print data transmitted from the mobile terminal 3 is printed by the image forming apparatus 1.

If the job execution is completed, the address information and the two-dimensional code created by the image forming apparatus 1 are aborted. Therefore, the image forming apparatus 1 only needs to temporarily hold address information permitted for each authentication session.

As described above, in this embodiment, the created address information is converted into the two-dimensional code, and the obtained two-dimensional code is displayed on the display 13 of the image forming apparatus 1. The user then photographs the displayed two-dimensional code through the mobile terminal 3, upon which the two-dimensional code is automatically and inversely converted into the original address information inside the mobile terminal 3. Then upon access to the obtained address and transmitting a job from the mobile terminal 3, a print job is executed by the image forming apparatus 1. Therefore, the user is no longer required to manually input the address of the image forming apparatus 1, thereby eliminating input errors, so that, through easy operation, instructions for job execution can be given from the mobile terminal 3 to the image forming apparatus 1.

Moreover, since user authentication data is reflected on the two-dimensional code, authentication of the user attempting access from the mobile terminal 3 can also be performed, thus ensuring sufficient security.

Figure 6A:
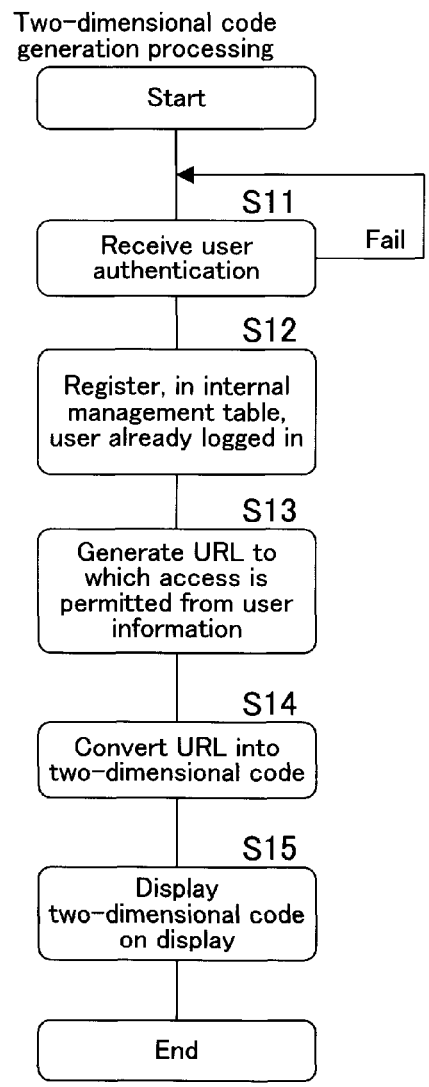
FIG. 6 is a flowchart showing two-dimensional code generation processing performed by the image forming apparatus, and processing performed when an access has been made by the mobile terminal.
Figure 6B:
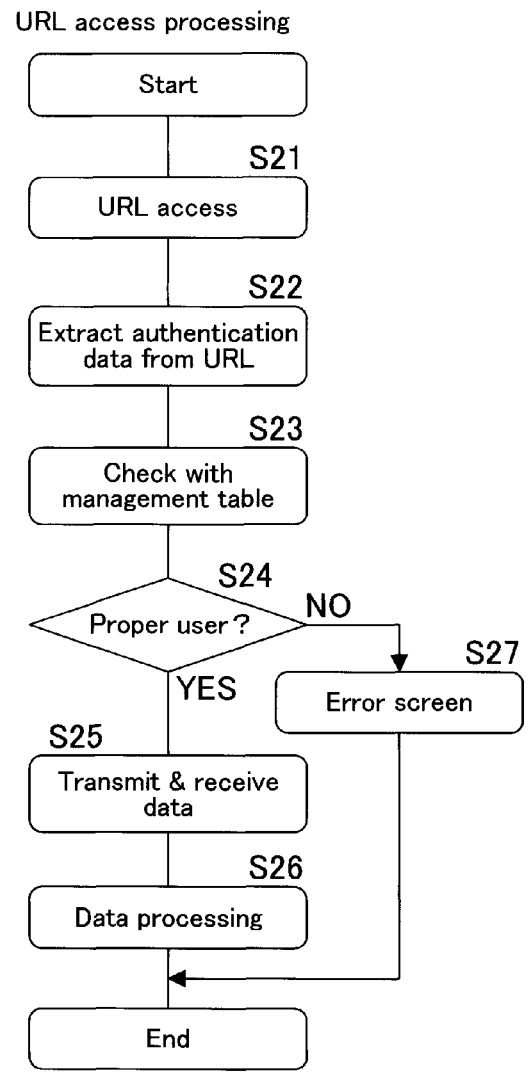

FIG. 6A is a flowchart showing two-dimensional code generation processing performed by the image forming apparatus 1. FIG. 6B is a flowchart showing processing performed when an access is made by the mobile terminal 3.

In FIG. 6A, first in step S11, the image forming apparatus 1 receives user authentication. If the authentication fails, the processing remains at step S11.

If the authentication succeeds, in step S12, the image forming apparatus 1 registers, in a management table of the storage unit 11, a user who has already logged in.

Then, in step S13, the image forming apparatus 1 reflects user information (authentication data) and generates address information to which access is permitted. In step S14, the image forming apparatus 1 converts the address information into a QR code. When a plurality of address information in accordance with respective purposes are generated, address information selected by the user is converted into a QR code.

Subsequently, in step S15, the image forming apparatus 1 displays on the display 13 the two-dimensional code obtained through the conversion, and then ends its processing.

In FIG. 6B, if the mobile terminal 3 accesses to the aforementioned address in step S21, the image forming apparatus 1 extracts authentication data from address information in step S22, and checks the authentication data with the management table stored in the storage unit 11 in step S23.

In step S24, if the check results show that the user is a proper user (i.e., YES in step S24), the image forming apparatus 1 permits job reception. In step S25, the image forming apparatus 1 performs data transmission and reception to and from the mobile terminal 3. In step S26, the image forming apparatus 1 prints transmitted data, and then ends its processing. On the other hand, if the user is not a proper user (i.e., No in step S24), in step S27, the image forming apparatus 1 displays an error screen on the display 13, and then ends its processing.

One embodiment of the present invention has been described above. However, the invention is not limited to the embodiment described above.

For example, in the embodiment described above, the mobile terminal 3 transmits a print job to the image forming apparatus 1. If the image forming apparatus 1 has a facsimile function, a facsimile transmission job may be transmitted to have the image forming apparatus 1 execute facsimile transmission. Moreover, both address information for facsimile transmission and address information for printing may be generated for the user to select one of them.

The embodiment indicated is such that user authentication data is reflected on address information, and user authentication is performed when the access is made by the mobile terminal 3. Address information may be a specific one on which no user authentication is reflected. In this case, an unspecified majority of users who have photographed two-dimensional codes are permitted to use the image forming apparatus 1.

A two-dimensional code into which address information is converted is displayed on the display 13. A two-dimensional code may be outputted onto the web, or may be printed, as long as this code is provided such that the user can photograph the two-dimensional code in the mobile terminal 3.

Further, a QR code is displayed as a two-dimensional code. Instead of the QR code, a PDF 417, a Maxi code, a Datamatrix, or the like may be used as a two-dimensional code.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image forming system comprising a printer and a mobile terminal,
wherein the printer comprises: a two-dimensional code output unit for outputting a two-dimensional code into which address information of the printer is converted; and a job execution unit for executing a job transmitted from the mobile terminal that has accessed the printer based on address information into which the two-dimensional code obtained by photographing an image of the two-dimensional code outputted from the printer by the mobile terminal is inversely converted,
wherein the mobile terminal comprises: a photographing unit for photographing the image of the two-dimensional code outputted from the printer; an inverse converter for inversely converting the photographed two-dimensional code into address information; and a communication unit for accessing an address of the printer, which address is obtained through the inverse conversion, to transmit a job.

2. The image forming system according to claim 1,
wherein the two-dimensional code output unit of the printer is a display for displaying a two-dimensional code.

3. The image forming system according to claim 1,
wherein the printer further comprises:
an address information generator for generating address information on which user authentication data is reflected;
a two-dimensional code converter for converting the generated address information into a two-dimensional code; and
an authentication unit for performing authentication based on the authentication data reflected on the address information from the mobile terminal, when the mobile terminal has accessed the printer based on the address information into which the two-dimension code is inversely converted.

4. The image forming system according to claim 1,
wherein the two-dimensional code is a QR code.

5. A printer comprising:
a two-dimensional code output unit for outputting a two-dimensional code into which address information of the printer is converted; and
a job execution unit for executing a job transmitted from a mobile terminal that has accessed the printer based on address information into which the two-dimensional code of which the image outputted from the printer is photographed by the mobile terminal is inversely converted.

6. The printer according to claim 5,
wherein the two-dimensional code output unit is a display for displaying a two-dimensional code.

7. The printer according to claim 5, further comprising:
an address information generator for generating address information on which user authentication data is reflected;
a two-dimensional code converter for converting the generated address information into a two-dimensional code; and an authentication unit for performing authentication based on the authentication data reflected on the address information from the mobile terminal, when the mobile terminal has accessed the printer based on the address information into which the two-dimension code is inversely converted.

8. The printer according to claim 5,
wherein the two-dimensional code is a QR code.

9. An image forming processing method including the steps of:
    outputting a two-dimensional code into which address information is converted from a printer;
    photographing an image of the two-dimensional code outputted from the printer by a mobile terminal;
    inversely converting the photographed two-dimensional code into the address information by the mobile terminal;
    accessing an address of the printer, which address is obtained through inverse conversion, to transmit a job from the mobile terminal; and
    executing the job transmitted from the mobile terminal by the printer.

10. The image forming processing method according to claim 9,
wherein the two-dimensional code outputting step is a step for displaying a two-dimensional code on a display of the printer.

11. The image forming processing method according to claim 9, further including the steps of:
    generating address information on which user authentication data is reflected by the printer;
    converting the generated address information into a two-dimensional code by the printer; and
    performing authentication by the printer based on the authentication data reflected on the address information from the mobile terminal, when the mobile terminal has accessed the printer based on the address information into which the two-dimension code is inversely converted.

12. The image forming processing method according to claim 9,
wherein the two-dimensional code is a QR code.

13. An image forming processing method including the steps of:
    outputting from a printer a two-dimensional code which includes address information of the printer;
    photographing with a mobile terminal an image of the two-dimensional code outputted from the printer;
    converting the photographed two-dimensional code into the address information;
    transmitting a job from the mobile terminal to the printer using the address information in the two-dimensional code; and
    executing the job transmitted from the mobile terminal by the printer.

* * * * *